United States Patent
Charles et al.

(10) Patent No.: US 12,547,500 B2
(45) Date of Patent: Feb. 10, 2026

(54) ENHANCED PROTECTION OF CHECKPOINT DATA IN A HIGH-PERFORMANCE COMPUTING CLUSTER

(71) Applicant: Dell Products, L.P., Hopkinton, MA (US)

(72) Inventors: Peniel Charles, Bangalore (IN); Owen Crowley, Carrigaline (IE)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 18/655,423

(22) Filed: May 6, 2024

(65) Prior Publication Data

US 2025/0342091 A1 Nov. 6, 2025

(51) Int. Cl.
*G06F 11/14* (2006.01)

(52) U.S. Cl.
CPC .............................. *G06F 11/1464* (2013.01)

(58) Field of Classification Search
CPC .................................................... G06F 11/1464
See application file for complete search history.

(56) References Cited

U.S. PATENT DOCUMENTS

| | | | |
|---|---|---|---|
| 2006/0026009 A1* | 2/2006 | Luhr | G06Q 50/165 |
| | | | 705/315 |
| 2017/0357552 A1* | 12/2017 | Ljubuncic | G06F 11/00 |
| 2021/0365456 A1* | 11/2021 | Kondiles | G06F 16/2462 |
| 2021/0409306 A1* | 12/2021 | Neog | H04L 41/16 |
| 2022/0100595 A1* | 3/2022 | Shapiro | G06F 11/26 |

* cited by examiner

*Primary Examiner* — Aleksandr Kerzhner
*Assistant Examiner* — Aryan D Toughiry
(74) *Attorney, Agent, or Firm* — Anderson Gorecki LLP

(57) ABSTRACT

HPC cluster nodes execute instances of an application, and periodically checkpoint data of the executing instances of the application are saved on each of the HPC cluster nodes. The HPC cluster nodes also implement Multi-Path Input/Output (MPIO) software that provide health status reports to a MPIO software management appliance. The MPIO software management appliance uses the health status reports to determine if any of the HPC cluster nodes is in a degraded state. To secure the checkpoint data, the HPC cluster nodes transmit the checkpoint data to a storage array. In response to a determination that one or more of the HPC cluster nodes is in a degraded state, the MPIO software management appliance instructs each of the non-degraded HPC cluster nodes to pause transmission of the checkpoint data to the storage array, to prioritize transmission of checkpoint data from the degraded HPC cluster nodes to the storage array.

14 Claims, 3 Drawing Sheets

ENHANCED PROTECTION OF CHECKPOINT DATA IN A HIGH-PERFORMANCE COMPUTING CLUSTER

FIELD

This disclosure relates to computing systems and related devices and methods, and, more particularly, to enhanced protection of checkpoint data in a high-performance computing cluster.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a system for enhanced protection of checkpoint data in a High-Performance Computing (HPC) cluster is provided. HPC cluster nodes implement Multi-Path Input/Output (MPIO) software that provide health status reports to an MPIO software management appliance. The MPIO software management appliance determines if any of the HPC cluster nodes is in a degraded state. The HPC cluster nodes execute instances of an application, and periodically checkpoint data of the executing instances of the application are saved on each of the HPC cluster nodes. To secure the checkpoint data, the HPC cluster nodes transmit the checkpoint data to a storage array. In response to a determination that one or more of the HPC cluster nodes is in a degraded state, the MPIO software management appliance instructs each of the non-degraded HPC cluster nodes to pause transmission of the checkpoint data to the storage array, to reduce IO pressure on the storage array and thus prioritize transmission of checkpoint data from the degraded HPC cluster nodes to the storage array. After the degraded HPC cluster nodes have transmitted their checkpoint data to the storage array, the other non-degraded HPC cluster nodes are instructed to transmit their checkpoint data to the storage array.

By prioritizing transfer of checkpoint data from HPC cluster node that have been determined to be in a degraded state, it is possible to secure data from the degraded HPC cluster nodes as quickly as possible, without requiring the degraded HPC cluster node to compete for bandwidth with the other HPC cluster nodes on the storage array or on the network. Specifically, by causing the non-degraded HPC cluster nodes to pause transfer of checkpoint data to the storage array until after the degraded HPC cluster nodes have been able to transfer their checkpoint data, it is possible to reserve bandwidth on the storage array and on the network to make it more likely that the degraded HPC cluster nodes will be able to transfer their checkpoint data before the degraded HPC cluster nodes actually fail.

In some embodiments, a method of providing enhanced protection of checkpoint data in a high-performance computing cluster, includes defining a High-Performance Computing (HPC) cluster including a plurality of HPC cluster nodes, executing an instance of a HPC application on each of the plurality of HPC cluster nodes, and generating data checkpoints by each instance of the HPC application. The method further includes executing a respective instance of Multi-Path Input/Output (MPIO) software on each of the plurality of HPC cluster nodes, generating health status reports by each respective instance of the MPIO software and transmitting the generated health status reports to a MPIO software management appliance, and using the health status reports, by the MPIO software management appliance, to determine whether any of the HPC cluster nodes is in a degraded state. The method further includes, in response to a determination that one of the HPC cluster nodes is in a degraded state, sending a first instruction to the MPIO software on each of the plurality of HPC cluster nodes that is in a non-degraded state to pause transmission of data checkpoints to a storage array, sending a second instruction to the HPC cluster node that is in the degraded state to transmit the its respective data checkpoint to the storage array, and after the HPC cluster node that is in the degraded state has completed transmission of the data checkpoints to the storage array, sending a third instruction to the MPIO software on each of the plurality of HPC cluster nodes that is in a non-degraded state to initiate transmission of the data checkpoints to the storage array.

In some embodiments, generating the data checkpoints by each instance of the HPC application includes generating a respective data checkpoint by each instance of the HPC application at a same instance in time. In some embodiments, the MPIO software is software configured to enable a HPC cluster node to select between multiple network paths to transmit data to the storage array.

In some embodiments, determining whether any of the HPC cluster nodes is in a degraded state comprises determining if any of the HPC cluster nodes is exhibiting one or more symptoms of hardware degradation or software failures, which may lead to failure of the HPC cluster node. In some embodiments, the health status reports includes temperature values for hardware components on the respective HPC cluster nodes.

In some embodiments, sending the second instruction to the HPC cluster node that is in the degraded state to transmit its respective data checkpoint to the storage array includes determining if the HPC cluster node has checkpoint data for more than one application, and in response to a determination that the HPC cluster node has checkpoint data for more than one application, prioritizing checkpoint data of a first of the applications over checkpoint data for the others of the applications, and using the second instruction to cause the HPC cluster node to prioritize transmission of its respective checkpoint data for the first of the applications to the storage array over transmission of its respective checkpoint for the other of the applications to the storage array.

In some embodiments, the method further includes using the health status reports, by the MPIO software management appliance, to determine that two or more of the HPC cluster nodes are in a degraded state. In response to a determination that two or more of the HPC cluster nodes are in the degraded state, the method includes determining a relative degradation of each of the two or more HPC cluster nodes that are in the degraded state, and prioritizing transmission of checkpoint data from a first of the HPC cluster nodes of the two or more HPC cluster nodes that is to be determined to be in a most degraded state. In some embodiments, prioritizing transmission of checkpoint data from the first of the HPC cluster nodes that is to be determined to be in the most degraded state comprises sending a fourth instruction to the MPIO software on each of the other HPC cluster nodes of the two or more HPC cluster nodes that are in the degraded state to pause transmission of data checkpoints by the other HPC cluster nodes that are in the degraded state until the first of the HPC cluster nodes that is determined to be in the most degraded state has completed transmission of its checkpoint data to the storage array. In some embodiments, the method further includes prioritizing transmission of checkpoint data from the first HPC cluster node that is determined to be in the most degraded state according to a priority of an application associated with the checkpoint data.

DETAILED DESCRIPTION

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
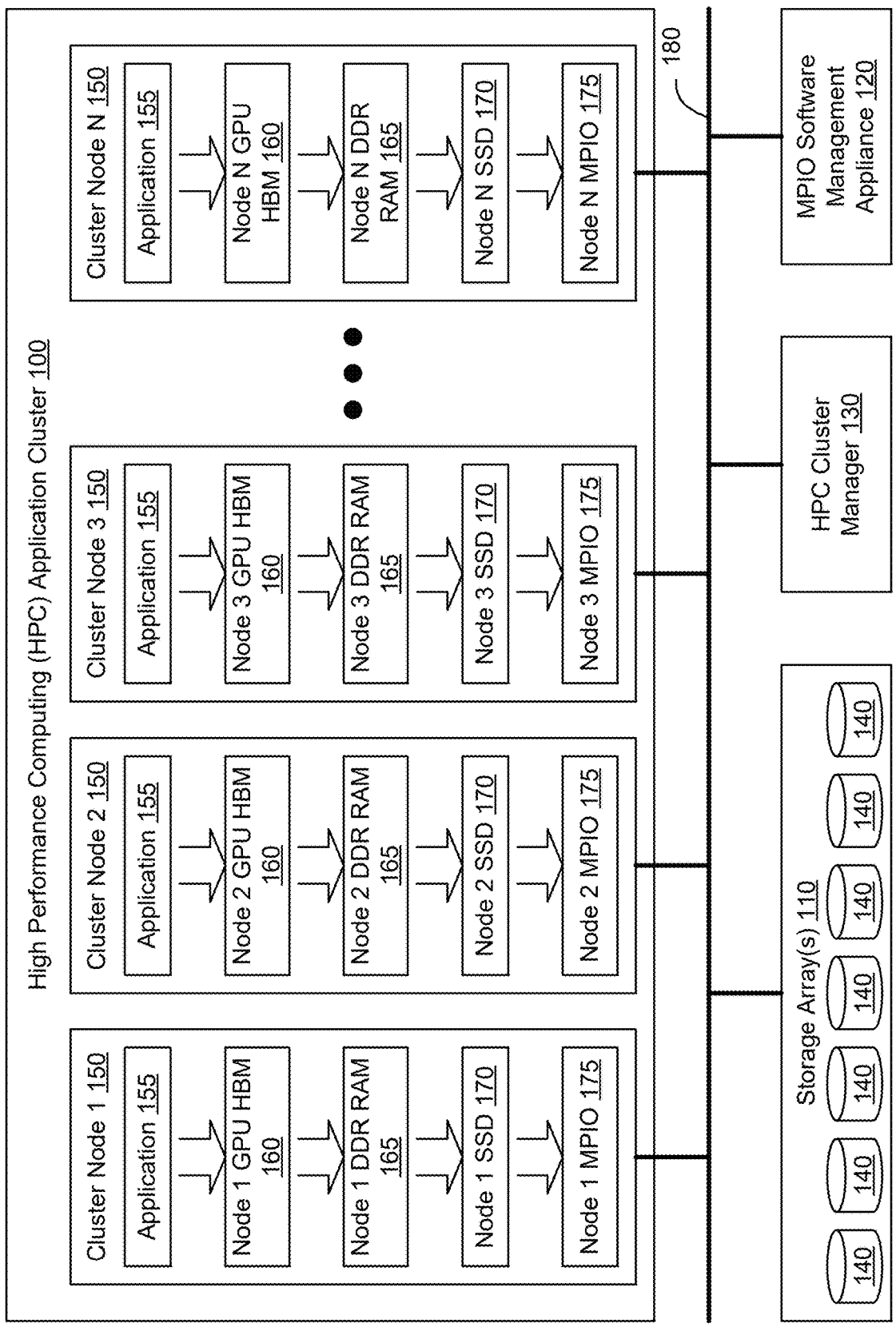
FIG. 1 is a block diagram of an example high-performance computing cluster, including an MPIO software management appliance configured to provide enhanced protection of checkpoint data in the high-performance computing cluster, according to some embodiments.

FIG. 1 is a block diagram of an example high-performance computing cluster, including an MPIO software management appliance 120 configured to provide enhanced protection of checkpoint data in the high-performance computing cluster, according to some embodiments. As shown in FIG. 1, in some embodiments a High-Performance Computing (HPC) application cluster 100 includes a plurality of HPC cluster nodes 150 that are managed by an HPC cluster manager 130. One or more storage arrays 110 provide storage services to the HPC cluster nodes 150 of the HPC cluster 100. The HPC cluster manager 130 may be connected to the HPC cluster 100 or may be included as one of the nodes of the HPC cluster 100, depending on the implementation.

Each HPC cluster node 150 includes an instance of an application 155 running on one or more processors with local volatile memory. Example processors may include a plurality of multi-core processors of one or more types, e.g., including multiple CPUs, GPUs, and combinations thereof. The local volatile memory may include, for example and without limitation, any type of RAM. In some embodiments, as shown in FIG. 1, the local volatile memory includes Graphic Processing Unit (GPU) High Bandwidth Memory (HBM), such as L1, L2, or L3 cache associated with the GPUs. In some embodiments, the GPU HBM is volatile memory. In some embodiments, the HPC cluster nodes 150 are implemented as servers, virtual machines, or containers.

High-Performance Computing (HPC) applications are used for purposes such as climate modeling, oil and gas exploration, and other processing intensive types of applications. These types of applications generate incredibly large amounts of data, which is typically spread across multiple HPC cluster nodes 150 required to generate the massive processing capabilities. Data generated by the instances of the application 155 executing on the HPC cluster nodes 150 is periodically saved, using what is referred to herein as a data checkpoint. In some embodiments, all of the applications save their current data at a particular instant in time, to create the data checkpoint. As the number of HPC cluster nodes 150 increases, more frequent and concurrent checkpoints of data are required to offset the corresponding increase in node failure rates.

In some embodiments, to service such checkpoints, the checkpoint data is stored at multiple levels within the HPC cluster node 150. For example, as shown in FIG. 1, in some embodiments the checkpoint data of the executing application 155 is initially stored in the High Bandwidth Memory 160 of the Graphics Processing Unit. That data is then flushed asynchronously to slower local storage on the HPC cluster node 150, such as to a Double Data Rate (DDR) Random Access Memory (RAM) 165, and then to a local Solid-State Drive (SSD) 170 on the HPC cluster node 150. By moving the checkpoint data asynchronously to other storage resources of the HPC cluster node 150, it is possible to allow the application 155 to continue executing without hitting a storage bottleneck.

In some embodiments, data of the HPC cluster nodes 150 is replicated within the cluster, for example to enable one HPC cluster node 150 to serve as a backup for another HPC cluster node 150. Thus, for example, checkpoint data for one node may be copied to a neighboring node so that, in the event that the original node fails, the checkpoint data is still available within the cluster. However, in the event of failure of both nodes, the checkpoint data can still be lost. Accordingly, in some embodiments, one or more storage arrays 110 are provided and, as checkpoints are created, the checkpoint data is moved from the storage resources of the HPC cluster nodes 150 to the managed drives 140 of the storage array 110, at which point it is considered safe.

As shown in FIG. 1, in some embodiments a storage array 110 provides data storage services for the HPC cluster nodes 150, and may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment)

drives, and FC (Fibre Channel) drives. In some embodiments the managed drives 140 are implemented using NVM (Non-Volatile Memory) media technologies, such as NAND-based flash, or higher-performing SCM (Storage Class Memory) media technologies such as 3D XPoint and ReRAM (Resistive RAM).

In instances where the collection of applications 155 of the HPC cluster node 150 of the HPC cluster 100 are operating at the PetaFLOP ($10^{15}$ floating point operations per second) performance level, or ExaFLOP ($10^{18}$ floating point operations per second) performance level, the applications 155 may spend considerable resources generating data checkpoints. During normal operation, the checkpoint data is able to be transferred asynchronously from the HPC cluster nodes 150 to the storage array 110 to secure the checkpoint data. However, in instances where one or more of the HPC cluster nodes 150 is in a degraded state, and hence in danger of failing, it would be advantageous to proactively transmit the checkpoint data of the HPC cluster node 150 to the storage array 110 as quickly as possible, preferably before the HPC cluster node actually fails.

According to some embodiments, a system for enhanced protection of checkpoint data in a High-Performance Computing (HPC) cluster 100 is provided. According to some embodiments, the HPC cluster 100 includes a HPC cluster manager 130 that specifies the creation of snapshots of data that is being generated by the executing instances of the applications 155 on the HCP cluster nodes. These data snapshots are referred to herein as data checkpoints. In some embodiments, all HPC cluster nodes 150 of the HPC cluster 100 save their respective copy of the checkpoint data at a particular instance, such that the checkpoint is a point-in-time recoverable image of the checkpoint data that existed at the time when the checkpoint was created. During normal operation, the HPC cluster nodes 150 save the checkpoint data from processor cache to persistent memory such as DDR/SSD, and then ultimately transmit the checkpoint data to the storage array 110.

In some embodiments, each HPC cluster node 150 also includes an instance of MultiPoint Input/Output (MPIO) software 175 executing on the HPC cluster node 150. MPIO software 175, as that term is used herein, is software configured to enable the HPC cluster node 150 to use multiple paths to transmit data to the storage array 110. One example of MPIO software 175 that is available from Dell™ is PowerPath™, although other types of MPIO software 175 may be used as well and PowerPath is mentioned merely as one example type of commercially available MPIO software. The MPIO software 175 monitors paths to the storage array 110 and preferentially transfers data on particular paths while those paths are operational. The MPIO software 175 enables each respective HPC cluster node 150 to therefore see the same endpoint (storage array 110) over multiple ports/interfaces, to enable high availability of the storage array 110 to the HPC cluster nodes 150 over the network 180 connecting the storage array 110 with the high-performance computing cluster 150.

In some embodiments, the MPIO software 175 on a given HPC cluster node 150 has root access on the host and, accordingly, can monitor the operation of the Operating System (OS) on the host. The MPIO software 175 therefore has access to component data of the hardware on which the HPC cluster node 150 is executing, such as the temperature of various components, and information regarding failure rates of particular components of the hardware on which the HPC cluster node 150 is implemented. According to some embodiments, the MPIO software on each HPC cluster node 150 generates health status updates that are transmitted to the MPIO software management appliance 120 on a regular basis. The MPIO software receives the health status updates from the HPC cluster nodes and determines from the health status updates whether any of the HPC cluster nodes is in a degraded state. By monitoring the health status of the HPC cluster node 150, the MPIO software management appliance 120 is able to determine, in advance of a failure of the HPC cluster node 150, that the HPC cluster node 150 is in a degraded state and hence in danger of failure. As used herein, the term "degraded state" is used to refer to a HPC cluster node 150 that is exhibiting one or more symptoms of hardware degradation or software failures, which may lead to failure of the HPC cluster node 150.

According to some embodiments, as shown in FIG. 1, an MPIO software management appliance 120 is connected to the HPC cluster 100 either directly or via network 180. The MPIO software management appliance 120, in some embodiments, is used to implement MPIO software 175 maintenance operations such as license management. For example, if a new HPC cluster node 150 is added to the HPC cluster 100, when the MPIO software 175 is loaded to the new HPC cluster node 150, the MPIO software management appliance 120 is responsible for ensuring that the MPIO software 175 is properly licensed, is the correct version, etc.

In some embodiments, the MPIO software management appliance 120 is used to receive status reports from instances of the MPIO software 175 executing on each of the HPC cluster nodes 150 implementing the HPC cluster 100, to determine if one of the HPC cluster nodes 150 is in a degraded state. For example, in some embodiments the MPIO software 175 on each of the HPC cluster node 150 periodically reports back temperature readings from the OS related to components of the HPC cluster node 150. In instances where one or more of the components has a temperature in excess of an expected temperature value, the MPIO software management appliance 120 can determine that the HPC cluster node 150 is in a degraded state and that failure of the HPC cluster node 150 is more likely than if the temperature was within a normal temperature range. In response to determination that one of the HPC cluster nodes 150 is in a degraded state, the MPIO software management appliance 120 prioritizes transmission of checkpoint data from that HPC cluster node 150 to the storage array 110, to secure the checkpoint data from the degraded cluster node 150 as quickly as possible in an attempt to prevent loss of the checkpoint data in the event of a subsequent failure of the HPC cluster node 150.

In some embodiments, if one of the HPC cluster node 150 of the HPC cluster 100 is determined to be degraded, data transfer of checkpoint data from the degraded HPC cluster node 150 to the storage array 110 is prioritized. The MPIO software management appliance 120 instructs all other HPC cluster nodes 150 of the HPC cluster 100 to stop sending checkpoint data (or to send the checkpoint data at a reduced rate), and instructs the degraded HPC cluster node 150 to transfer all its data of the current checkpoint. After the degraded HPC cluster node 150 has completed transmission of its checkpoint data to the storage array 110, the other HPC cluster nodes 150 are instructed to transmit their checkpoint data to the storage array 110. In instances where multiple HPC cluster nodes 150 are determined to be in a degraded state, in some embodiments the MPIO software management appliance 120 prioritizes transmission of checkpoint data from the set of degraded HPC cluster nodes 150 based on the severity of degradation.

In some embodiments, a given degraded HPC cluster node 150 or a set of HPC cluster nodes that are determined to be degraded, may be executing several different applications 155, which may have different priorities. In instances where a node (or set of nodes) that is determined to be in a degraded state has data for a high-priority application, destaging the checkpoint data from the high-priority application can be prioritized on the storage array 110 to quickly move the checkpoint data of the high-priority to back-end storage resources of storage array before moving the checkpoint data of the lower-priority applications. Thus, quickly marshalling the checkpoint data all the way from the HPC cluster node 150 to the managed storage resources 140 of storage array 110, to protect the checkpoint data from failure of the HPC cluster node 150. An example of a high-priority application data might be, for example, Oracle Database Re-Do Logs. Those logs should be quickly persisted, since they describe the transactions on the database. By contrast, an example of a low-priority application might be a SQL database that was being used for testing.

Figure 2:
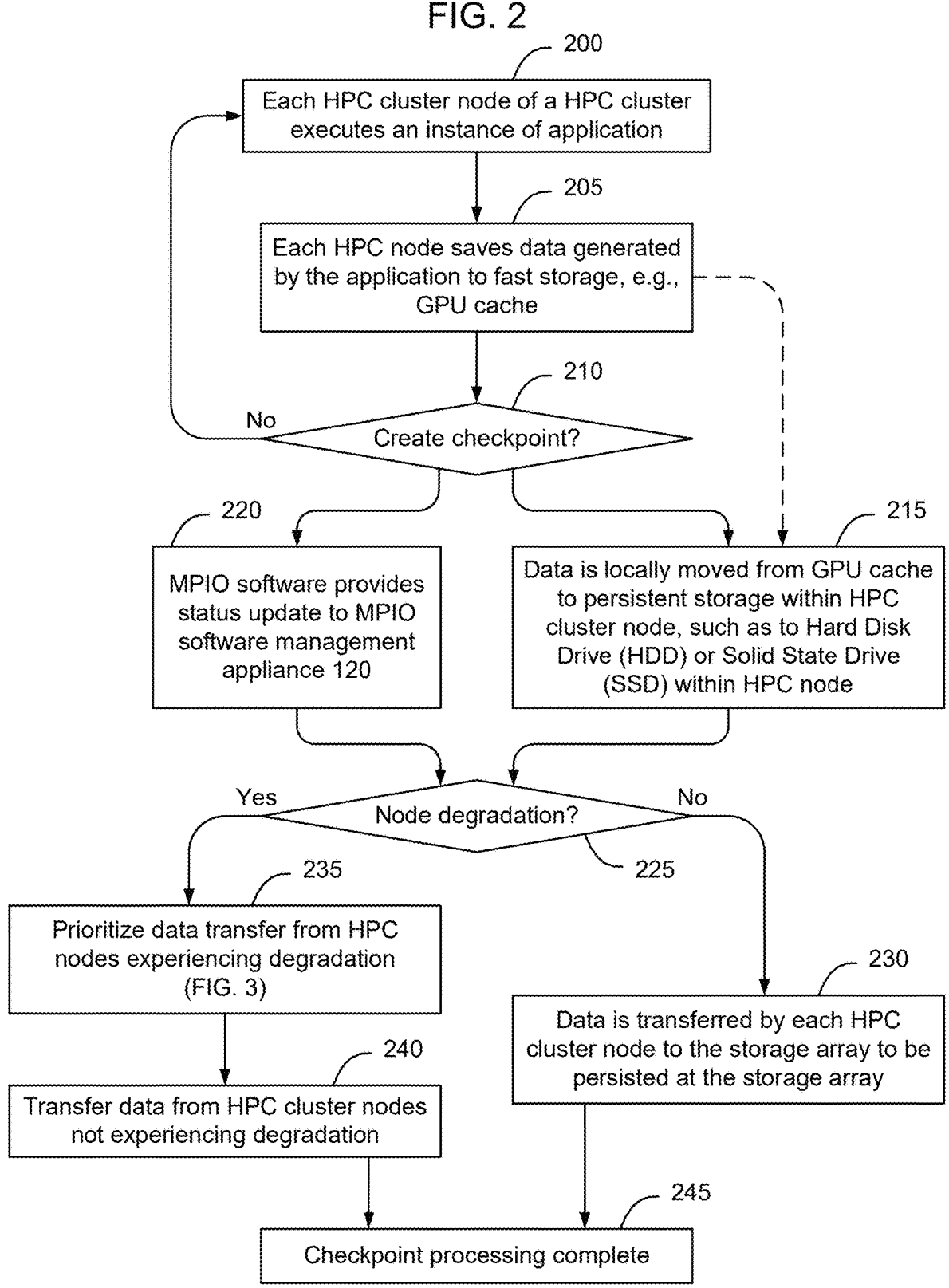
FIGS. 2-3 are flow charts of an example process of persisting checkpoint data from computing nodes of a high-performance computing cluster to provide enhanced protection of the checkpoint data in the high-performance computing cluster, according to some embodiments.
Figure 3:
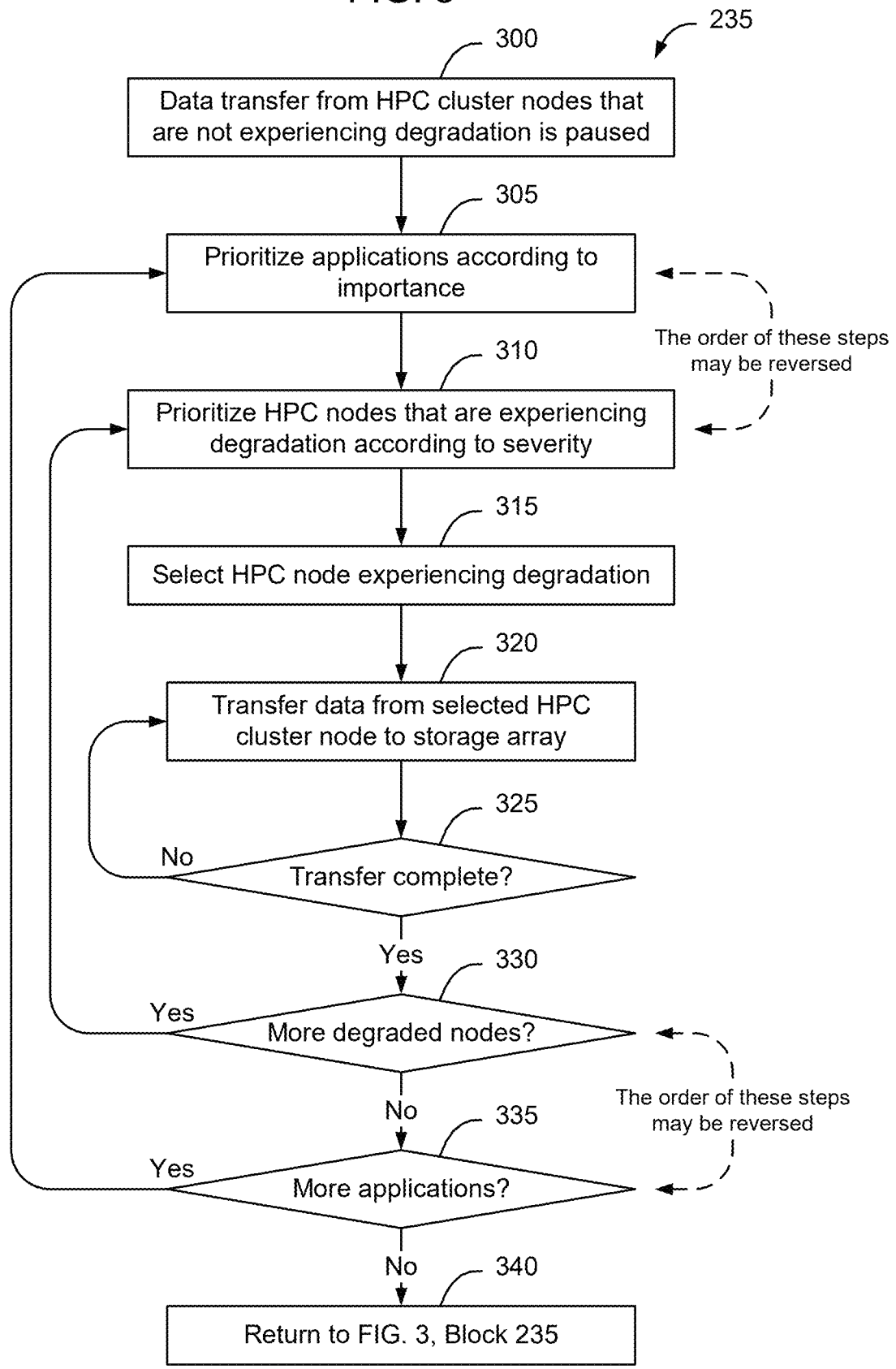

FIGS. 2-3 are flow charts of an example process of persisting checkpoint data from computing nodes of a HPC cluster 100 to provide enhanced protection of the checkpoint data in the high-performance computing cluster, according to some embodiments. As shown in FIG. 2, in some embodiments each HPC cluster node 150 of a HPC cluster 100 executes an instance of the application 155 (block 200). Each HPC cluster node 150 saves data generated by its instance of the application 155 to fast storage, such as to the GPU cache (block 205). Optionally, as shown using the dashed line, data may also be locally stored on the HPC cluster node 150 to other forms of storage media such as to RAM 165 or SSD 170, and optionally may also be replicated within the HPC cluster 100 to other HPC cluster nodes 150 to provide redundancy for the checkpoint data within the HPC cluster 100.

In some embodiments, the HPC cluster manager 130 periodically issues an instruction to the HPC cluster node 150 to cause the HPC cluster nodes 150 to create a data checkpoint (block 205). In between checkpoint creations (in response to a determination of NO at block 210), the instances of the applications continue executing on each of the HPC cluster node 150. When a data checkpoint is to be created (in response to a determination of YES at block 210), each node locally stores a copy of the application data from the high-performance memory such as GPU cache to other storage resources such as RAM 165 and SSD 170 (block 215). Preferably, the checkpoint data is saved to persistent memory at this stage (block 215) so that the checkpoint data is protected against a loss of power at the HPC cluster node 150.

In some embodiments, the MPIO software 175 on each node provides periodic MPIO health status updates to the MPIO software management appliance 120 (block 220). Each MPIO status updates includes information about the overall health of the HPC cluster node 150. In some embodiments, the status updates contain parameters derived from components of the HPC cluster node 150 that enable the MPIO software management appliance 120 to determine whether the respective HPC cluster node 150 is showing any symptoms of hardware degradation. Example symptoms of degradation of a HPC cluster node 150 may include, for example, repeated SCSI errors reported against 10 paths of the HPC cluster node 150, excessive fan speeds, hardware temperature levels in excess of predetermined temperature thresholds, etc. There are many possible symptoms of possible degradation, and the particular symptoms or combinations of symptoms monitored by the MPIO software management appliance 120 may depend on the particular implementation.

In some embodiments, a determination is then made as to whether any of the HPC cluster nodes 150 is in a degraded state (block 225). As used herein, the term "degraded state" is used to refer to a HPC cluster node 150 that is exhibiting one or more symptoms of hardware degradation or software failures, which may lead to failure of the HPC cluster node 150. If no HPC cluster node 150 is determined to be in a degraded state (a determination of NO at block 225), the MPIO software management appliance 120 doesn't interfere with data transfer between the HPC cluster node 150 and the storage array 110, such that transmission of the checkpoint data between the HPC cluster node 150 and the storage array 110 is implemented in a normal manner (block 230). Once all of the checkpoint data has been transferred from the HPC cluster node 150 to the storage array 110, checkpoint processing is complete (block 245).

If one or more of the HPC cluster nodes 150 is determined to be in a degraded state (a determination of YES at block 225), in some embodiments the MPIO software management appliance 120 prioritizes data transfer from the HPC cluster nodes 150 that are determined to be in a degraded state (block 235). Additional details regarding how the MPIO software management appliance 120 prioritizes data transfer from the HPC cluster nodes 150 that are determined to be in a degraded state are provided in connection with FIG. 3. After prioritizing data transfer from the HPC cluster nodes 150 that are determined to be in the degraded state (block 235), the remaining HPC cluster nodes 150 that are determined to not be in a degraded state transfer their checkpoint data to the storage array 110 (block 240). Once all checkpoint data has been transferred from the HPC cluster nodes 150 to the storage array 110, checkpoint processing is complete (block 245).

FIG. 3 is a flow chart of an example process implemented by the MPIO software management appliance 120 to prioritize data transfer from the HPC cluster nodes 150 that are determined to be in a degraded state, according to some embodiments. As shown in FIG. 3, in some embodiments if one or more of the HPC cluster nodes 150 has been determined by the MPIO software management appliance 120 to be in a degraded state, the MPIO software management appliance 120 pauses data transfer from all of the other HPC cluster nodes 150 of the HPC cluster 100 that are determined to not be in a degraded state (block 300). Specifically, in some embodiments the MPIO software management appliance 120 sends a message to the MPIO software 175 executing on each HPC cluster node 150 that is not experiencing degradation, to instruct the MPIO software 175 on those nodes to pause transferring checkpoint data to the storage array 110.

In some embodiments, as shown in FIG. 3, the MPIO software management appliance 120 prioritizes applications according to importance (block 305), and prioritizes nodes that are experiencing degradation according to the severity of the degradation of the HPC cluster node 150 (block 310). For example, if only one HPC cluster node 150 is determined to be degraded, and that HPC cluster node 150 is processing workload for two or more applications, transferring checkpoint data from the degraded HPC cluster node 150 to the storage array 110 for the more important application is prioritized over checkpoint data for less important applications by the MPIO software management appliance 120 in block 305. Likewise, if two or more HPC cluster node 150 are both processing the same application, and are both determined to be degraded, the MPIO software management appliance 120 will prioritize the HPC cluster node 150 that is determined to be more severely degraded in block 310.

The MPIO software management appliance 120 thus selects one of the applications based on application priority (block 305) and selects one of the HPC cluster nodes 150 that is processing workload for that application that is experiencing degradation (block 315). The MPIO software management appliance 120 then instructs the selected node to transfer data from the selected node to the storage array 110 (block 320). The MPIO software management appliance 120 waits for checkpoint data transfer from the selected node to complete (block 325). Upon determination that data transfer is complete (a determination of YES at block 325), the MPIO software management appliance 120 determines if there are additional degraded HPC cluster nodes 150 that are also processing workload for the selected application (block 330). In response to a determination that there are other nodes that are processing workload for the selected application (a determination of YES at block 330), the MPIO software management appliance 120 selects a subsequent node and transfers data from that degraded HPC cluster node 150 to the storage array 110.

Once all of the degraded HPC cluster nodes 150 that are processing workload for the selected application have transferred their checkpoint data to the storage array 110 (a determination of NO at block 330), the MPIO software management appliance 120 begins processing lower-priority applications and causing nodes that are in a degraded state to transfer checkpoint data for the lower-priority applications to the storage array 110. Specifically, as shown in FIG. 3, in some embodiments the MPIO software management appliance 120 determines if there are additional applications that have HPC cluster nodes 150 that have been determined to be in a degraded state (block 335). In response to a determination that there are additional applications of this nature (a determination of YES at block 335), the MPIO software management appliance 120 selects the next application (block 305) and iteratively selects degraded HPC cluster nodes 150 according to degradation severity (block 310) to iteratively cause each selected node to transfer its checkpoint data for the selected application. The process iterates until all degraded HPC cluster nodes 150 have transferred their checkpoint data for all applications (a determination of NO at block 335) at which point the process returns to FIG. 2, block 240 such that the remaining non-degraded HPC cluster nodes 150 are able to transfer their checkpoint data to the storage array 110.

Although FIG. 3 has been described in connection with some embodiments in which the MPIO software management appliance 120 prioritizes transmission of checkpoint data for high-priority applications over checkpoint data for lower-priority applications, as noted in FIG. 3 in some embodiments several steps may be reversed depending on the implementation. For example, in some embodiments the MPIO software management appliance 120 may prioritize transmission of checkpoint data from HPC cluster nodes 150 based on the severity of the degradation of the HPC cluster nodes 150 and, once a cluster node is selected, then transfer all checkpoint data from the selected node based on the priority of the application. In this embodiment, once a HPC cluster node is selected, it will transfer all of its checkpoint data to the storage array 110 by first transmitting all checkpoint data for the highest priority application, then transmitting all checkpoint data for the next priority application, etc., until all checkpoint data has been transmitted. The MPIO software management appliance will then select the next most severely degraded HPC cluster node 150, and transfer all the checkpoint data from that selected HPC cluster node 150.

By prioritizing transfer of checkpoint data from HPC cluster node 150 that have been determined to be in a degraded state, it is possible to secure data from the degraded HPC cluster nodes 150 as quickly as possible, without requiring the degraded HPC cluster node 150 to compete for bandwidth on the network 180 and bandwidth of the storage array 110 with the other HPC cluster node 150. Specifically, by causing the non-degraded HPC cluster nodes 150 to pause transfer of checkpoint data to the storage array 110 until after the degraded HPC cluster nodes 150 have been able to transfer their checkpoint data, it is possible to reserve bandwidth on the network 180 and on the storage array 110 to make it more likely that the degraded HPC cluster nodes 150 will be able to transfer their checkpoint data before the degraded HPC cluster nodes actually fail. After transfer of the checkpoint data, the HPC cluster manager 130 may elect to shut down the HPC cluster node 150 that has been determined to be in a degraded state, or elect to continue using the HPC cluster node 150, depending on the particular implementation and the manner in which the HPC cluster manager 130 is configured to manage the HPC cluster 100.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of providing enhanced protection of checkpoint data in a high-performance computing cluster, comprising:

defining a High-Performance Computing (HPC) cluster including a plurality of HPC cluster nodes;

executing an instance of a HPC application on each of the plurality of HPC cluster nodes;

generating data checkpoints by each instance of the HPC application;

asynchronously from generating the data checkpoints, transmitting checkpoint data of the generated data checkpoints by each instance of the HPC application to a storage array;

executing a respective instance of Multi-Path Input/Output (MPIO) software on each of the plurality of HPC cluster nodes, the MPIO software having root access on the HPC cluster node to access component data on the HPC cluster node including component temperature and component failure information;

generating health status reports by each respective instance of the MPIO software from the component temperature and component failure information and transmitting the generated health status reports to a MPIO software management appliance;

using the health status reports, by the MPIO software management appliance, to determine whether any of the HPC cluster nodes is in a degraded state by determining if any of the HPC cluster nodes is exhibiting one or more symptoms of hardware degradation or software failures, which may lead to failure of the HPC cluster node;

in response to a determination that one of the HPC cluster nodes is in a degraded state, prioritizing transmission of checkpoint data from the one of the HPC cluster nodes that is determined to be in the degraded state to the storage array, by:

sending a first instruction by the MPIO software management appliance to the MPIO software on each of the plurality of HPC cluster nodes that is in a non-degraded state, to instruct the HPC cluster nodes that are in the non-degraded state to pause transmission of respective data checkpoints to a storage array;

sending a second instruction by the MPIO software management appliance to the HPC cluster node that is in the degraded state, to instruct the HPC cluster node that is in the degraded state to transmit its respective data checkpoint to the storage array; and after the HPC cluster node that is in the degraded state has completed transmission of the data checkpoints to the storage array, sending a third instruction by the MPIO software management appliance to the MPIO software on each of the plurality of HPC cluster nodes that is in the non-degraded state, to instruct the HPC cluster nodes that are in the non-degraded state to initiate transmission of the respective data checkpoints to the storage array.

2. The method of claim 1, wherein generating the data checkpoints by each instance of the HPC application comprises generating a respective data checkpoint by each instance of the HPC application at a same instance in time.

3. The method of claim 1, wherein sending the second instruction to the HPC cluster node that is in the degraded state to transmit its respective data checkpoint to the storage array comprises:

determining if the HPC cluster node has checkpoint data for more than one application; and in response to a determination that the HPC cluster node has checkpoint data for more than one application, prioritizing checkpoint data of a first of the applications over checkpoint data for the others of the applications, and using the second instruction to cause the HPC cluster node to prioritize transmission of its respective checkpoint data for the first of the applications to the storage array over transmission of its respective checkpoint for the other of the applications to the storage array.

4. The method of claim 1, further comprising using the health status reports, by the MPIO software management appliance, to determine that two or more of the HPC cluster nodes are in a degraded state;

in response to a determination that two or more of the HPC cluster nodes are in the degraded state:

determining a relative degradation of each of the two or more HPC cluster nodes that are in the degraded state; and prioritizing transmission of checkpoint data from a first of the HPC cluster nodes of the two or more HPC cluster nodes that is to be determined to be in a most degraded state.

5. The method of claim 4, wherein prioritizing transmission of checkpoint data from the first of the HPC cluster nodes that is to be determined to be in the most degraded state comprises sending a fourth instruction to the MPIO software on each of the other HPC cluster nodes of the two or more HPC cluster nodes that are in the degraded state to pause transmission of data checkpoints by the other HPC cluster nodes that are in the degraded state until the first of the HPC cluster nodes that is determined to be in the most degraded state has completed transmission of its checkpoint data to the storage array.

6. The method of claim 4, further comprising prioritizing transmission of checkpoint data from the first HPC cluster node that is determined to be in the most degraded state according to a priority of an application associated with the checkpoint data.

7. The method of claim 1, wherein the MPIO software is software configured to enable a HPC cluster node to select between multiple network paths to transmit data to the storage array.

8. A system for providing enhanced protection of checkpoint data in a high-performance computing cluster, comprising:

one or more processors and one or more storage devices storing instructions that are configured, when executed by the one or more processors, to cause the one or more processors to perform operations comprising:

defining a High-Performance Computing (HPC) cluster including a plurality of HPC cluster nodes;

executing an instance of a HPC application on each of the plurality of HPC cluster nodes;

generating data checkpoints by each instance of the HPC application;

asynchronously from generating the data checkpoints, transmitting checkpoint data of the generated data checkpoints by each instance of the HPC application to a storage array;

executing a respective instance of Multi-Path Input/Output (MPIO) software on each of the plurality of HPC cluster nodes, the MPIO software having root access on the HPC cluster node to access component data on the HPC cluster node including component temperature and component failure information;

generating health status reports by each respective instance of the MPIO software from the component temperature and component failure information and transmitting the generated health status reports to a MPIO software management appliance;

using the health status reports, by the MPIO software management appliance, to determine whether any of the HPC cluster nodes is in a degraded state by determining if any of the HPC cluster nodes is exhibiting one or more symptoms of hardware degradation or software failures, which may lead to failure of the HPC cluster node;

in response to a determination that one of the HPC cluster nodes is in a degraded state, prioritizing transmission of checkpoint data from the one of the HPC cluster nodes that is determined to be in the degraded state to the storage array, by:

sending a first instruction by the MPIO software management appliance to the MPIO software on each of the plurality of HPC cluster nodes that is in a non-degraded state, to instruct the HPC cluster nodes that are in the non-degraded state to pause transmission of respective data checkpoints to a storage array;

sending a second instruction by the MPIO software management appliance to the HPC cluster node that is in the degraded state, to instruct the HPC cluster node that is in the degraded state to transmit its respective data checkpoint to the storage array; and after the HPC cluster node that is in the degraded state has completed transmission of the data checkpoints to the storage array, sending a third instruction by the MPIO software management appliance to the MPIO software on each of the plurality of HPC cluster nodes that is in the non-degraded, state to instruct the HPC cluster nodes that are in the non-degraded state to initiate transmission of the respective data checkpoints to the storage array.

9. The system of claim 8, wherein generating the data checkpoints by each instance of the HPC application comprises generating a respective data checkpoint by each instance of the HPC application at a same instance in time.

10. The system of claim 8, wherein sending the second instruction to the HPC cluster node that is in the degraded state to transmit its respective data checkpoint to the storage array comprises:

determining if the HPC cluster node has checkpoint data for more than one application; and in response to a determination that the HPC cluster node has checkpoint data for more than one application, prioritizing checkpoint data of a first of the applications over checkpoint data for the others of the applications, and using the second instruction to cause the HPC cluster node to prioritize transmission of its respective checkpoint data for the first of the applications to the storage array over transmission of its respective checkpoint for the other of the applications to the storage array.

11. The system of claim 8, further comprising using the health status reports, by the MPIO software management appliance, to determine that two or more of the HPC cluster nodes are in a degraded state;

in response to a determination that two or more of the HPC cluster nodes are in the degraded state:

determining a relative degradation of each of the two or more HPC cluster nodes that are in the degraded state; and prioritizing transmission of checkpoint data from a first of the HPC cluster nodes of the two or more HPC cluster nodes that is to be determined to be in a most degraded state.

12. The system of claim 11, wherein prioritizing transmission of checkpoint data from the first of the HPC cluster nodes that is to be determined to be in the most degraded state comprises sending a fourth instruction to the MPIO software on each of the other HPC cluster nodes of the two or more HPC cluster nodes that are in the degraded state to pause transmission of data checkpoints by the other HPC cluster nodes that are in the degraded state until the first of the HPC cluster nodes that is determined to be in the most degraded state has completed transmission of its checkpoint data to the storage array.

13. The system of claim 11, further comprising prioritizing transmission of checkpoint data from the first HPC cluster node that is determined to be in the most degraded state according to a priority of an application associated with the checkpoint data.

14. The system of claim 8, wherein the MPIO software is software configured to enable a HPC cluster node to select between multiple network paths to transmit data to the storage array.

* * * * *